(12) United States Patent
Chao

(10) Patent No.: US 6,733,121 B1
(45) Date of Patent: May 11, 2004

(54) ONE PIECE FRONT FACE FOR MAGNIFYING OR CORRECTING GLASSES

(75) Inventor: George W. Chao, Chiayi (TW)

(73) Assignee: Contour Optik, Inc., Chiayi (TW)

( * ) Notice: Subject to any disclaimer, the term of this patent is extended or adjusted under 35 U.S.C. 154(b) by 0 days.

(21) Appl. No.: 10/127,336

(22) Filed: Apr. 22, 2002

(51) Int. Cl.⁷ .............................. G02C 7/02; G02C 7/10
(52) U.S. Cl. .......................... 351/159; 331/41; 331/44
(58) Field of Search ........................... 351/41, 44, 159

(56) References Cited

U.S. PATENT DOCUMENTS 5,406,337 A * 4/1995 Metcalfe et al. ............ 351/109
5,604,547 A * 2/1997 Davis et al. .................. 351/44

* cited by examiner

*Primary Examiner*—Scott J. Sugarman
(74) *Attorney, Agent, or Firm*—Greenberg Traurig, LLP

(57) ABSTRACT

The present invention is directed to a method of forming a unitary front face for eyeglasses provided with lenses that have magnifying power.

5 Claims, 1 Drawing Sheet

ONE PIECE FRONT FACE FOR MAGNIFYING OR CORRECTING GLASSES

FIELD OF THE INVENTION

The present invention is directed to the reading glasses, and a method of manufacturing same.

BACKGROUND OF THE INVENTION

Reading glasses may have a unitary front face. That is, a unitary piece having a nosepiece and lenses. These glasses are manufactured in one-piece injection molding machines. The lenses are provided with magnifying power to aid the user.

The disadvantage of forming the lenses in accordance with this method is that a design or appearance requires a specific mold. When a design change is effected, the mold must be changed. As a practical matter, the number of designs that can be made at any given time is determined by the number of molds possessed by the manufacturer. It may not be practical to have a number of molds at a given time, since molds are relatively expensive. Therefore, it would be desirable to provide the manufacturer with a method of manufacturing the front face of a pair of eyeglasses that provides greater freedom of choice in manufacturing a design from any number of design candidates, and in switching designs or between between multiple designs, when the manufacturer desires to do so.

SUMMARY OF THE INVENTION

The present invention is directed to a method of manufacturing the front face of a pair of eyeglasses that exhibits a magnifying power or a correcting power. Lenses having a magnifying power magnify an image for the wear of the glasses, such as those who desire reading glasses, whether prescriptive or non-prescriptive, or those who are farsighted Lenses having a corrective power bring an image into focus for the wearer of the glasses, such as those who are compensating for nearsightedness or an astigmatism to name but two examples.

According to the first aspect of the present invention there is provided a method of forming a unitary front face for eyeglasses provided with lenses that have magnifying power. The unitary front face is formed from a blank comprising the material for a pair of lenses, and a bridge portion, wherein the lens portions are provided with magnifying power or correcting power. The lens blank is cut, with a grinding machine or the like, to the contours of a design that has been preselected by the manufacturer or purchaser. The so-produced front face for eyeglasses and then be subjected to finishing steps, such as polishing the edges of the front face and drilling through bores at the appropriate locations of the front face so that a nose pad and/or arms can be attached to the front face.

DETAILED DESCRIPTION OF THE PREFERRED EMBODIMENT

Figure 1:
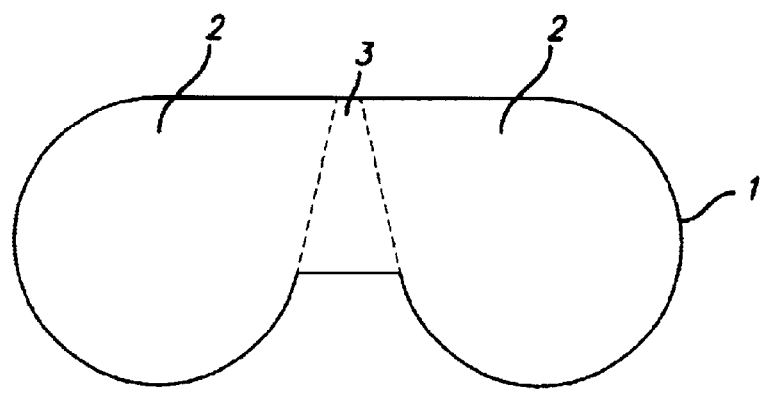
FIG. 1 is a top plan view of a lens blank that can be used in the method of the present invention.
Figure 2:
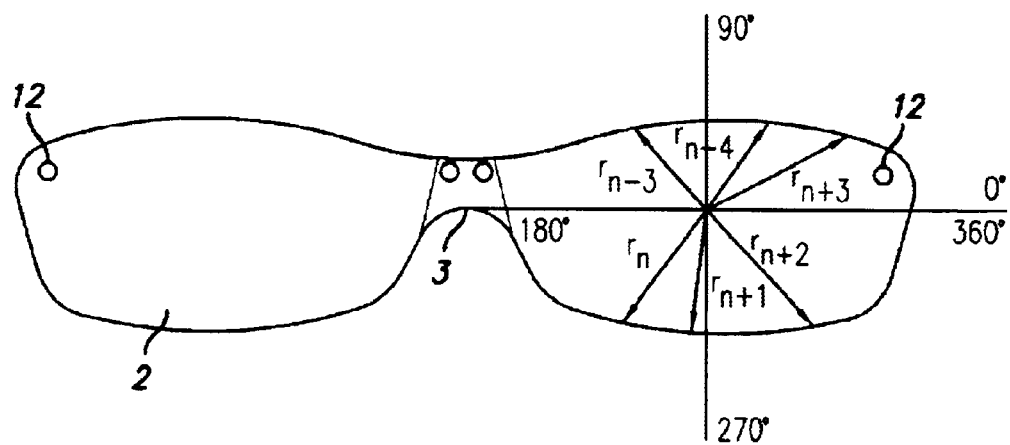
FIG. 2 is a top plan view of a front face for a pair of eyeglasses that has been prepared according to the method of the present invention.

According to the first aspect of the present invention there is provided a method of forming a unitary front face for eyeglasses provided with lenses that have magnifying power. The unitary front face is formed from a blank 1 including the components for a pair of eyeglasses, namely a pair of lenses 2 and a bridge portion 3. The lens portions is provided with magnifying power. That is, the lenses will enable the wearer of eyeglasses that include the finished front frame portion to see items in a magnified and or focused state that is superior to what the user would see if he or she were not wearing eyeglasses that include the finished front frame portion.

The lens blank is cut, with a grinding machine or the like, to the contours of a design that has been preselected by the manufacturer or purchaser. The design includes the size and dimensions of the lenses, which may be expressed in terms of polar coordinates, that is, as a number of radii extending 360° around a central point 20 on the lens. Several radii are shown on the lenses for exemplary purposes: $r_n$, $r_{n+1}$, $r_{n+2}$, etc.

The so-produced front face 10 for eyeglasses and then be subjected to finishing steps, such as polishing the edges of the front face and drilling through bores 12 at the appropriate locations of the front face so that a nose piece and arms can be attached to the front face.

Suitable machines to use in practicing the method are the Nidek SE 9090, available from Nidek Incorporated, Fremont Calif.

I claim:

1. A method of forming a front face of a pair of eyeglasses, comprised of the steps of:

selecting a blank having a plurality of pre-formed lens portions and a pre-formed bridge portion, each of the lens portions having one of magnifying power and correcting power;

selecting a design for the front face of the pair of eyeglasses;

cutting or grinding the blank in accordance with the design to form the front face of the pair of eyeglasses; and providing a plurality of through holes in the front face of the pair of eyeglasses at locations where a nose piece and a plurality of arms are attached to the front face.

2. The method of claim 1, wherein the edges of the front face of the pair of eyeglasses are finished.

3. The method of claim 1, wherein the edges of the front face of the pair of eyeglasses are smoothed.

4. The method of claim 1, wherein the design of the front face of the pair of eyeglasses is determined by a number of radii extending 360° around a central point on each of the lens portions.

5. A method of forming a front face of a pair of eyeglasses; comprised of the steps of:

selecting a blank having a plurality of pre-formed lens portions and a pre-formed bridge portion, each of the lens portions having one of magnifying power and correcting power;

selecting a design for the front face of the pair of eyeglasses;

cutting or grinding the blank in accordance with the design to form the front face of the pair of eyeglasses; and providing a plurality of through holes in the front face of the pair of eyeglasses at locations where a nose piece and a plurality of arms are attached to the front face;

wherein the design of the front face of the pair of eyeglasses is determined by a number of radii extending 360° around a central point on each of the lens portions; and wherein the edges of the front face of the pair of eyeglasses are processed by at least one of:(a) finishing; and (b) smoothing.

* * * * *